(12) United States Patent
Zhao et al.

(10) Patent No.: US 9,713,104 B2
(45) Date of Patent: Jul. 18, 2017

(54) METHOD AND APPARATUS FOR REPORTING POWER HEADROOM IN CARRIER AGGREGATION SCENARIO

(71) Applicant: CHINA ACADEMY OF TELECOMMUNICATIONS TECHNOLOGY, Beijing (CN)

(72) Inventors: Yali Zhao, Beijing (CN); Fangli Xu, Beijing (CN); Xiaodong Yang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 13/691,739

(22) Filed: Dec. 1, 2012

(65) Prior Publication Data

US 2013/0188570 A1    Jul. 25, 2013

Related U.S. Application Data

(63) Continuation of application No. PCT/CN2011/078387, filed on Aug. 12, 2011.

(30) Foreign Application Priority Data

Aug. 13, 2010 (CN) .......................... 2010 1 0253657

(51) Int. Cl.
*H04W 52/36* (2009.01)
*H04L 5/00* (2006.01)
*H04W 52/34* (2009.01)

(52) U.S. Cl.
CPC .......... *H04W 52/365* (2013.01); *H04L 5/001* (2013.01); *H04L 5/0007* (2013.01);
(Continued)

(58) Field of Classification Search
CPC ...................................................... H04W 52/36
(Continued)

(56) References Cited

U.S. PATENT DOCUMENTS 8,315,320 B2 * 11/2012 Zhang et al. ................. 375/260
8,351,359 B2 *  1/2013 Heo ..................... H04W 52/365
                                                              370/310
(Continued)

FOREIGN PATENT DOCUMENTS

CN    101340605 A    1/2009
CN    101715207 A    5/2010
(Continued)

OTHER PUBLICATIONS

Extended European Search Report and Search Opinion from EPO application No. 11816124.9 dated Nov. 3, 2016.
(Continued)

*Primary Examiner* — Rasheed Gidado
(74) *Attorney, Agent, or Firm* — Ladas & Parry, LLP

(57) ABSTRACT

Disclosed are a method and an apparatus for reporting power headroom in a carrier aggregation context. By applying the technical solutions of the embodiments of the present invention, PHR MAC CE and a corresponding MAC sub-header are determined according to the number of uplink component carriers needing to report power headroom and a type of the power headroom to be reported, and indication information such as length information of the PHR MAC CE, type information of the power headroom, and information about whether the power headroom is virtual power headroom is carried therein, so that a base station can precisely obtain the power headroom of each uplink component carrier. In this way, the problem that the PHR MAC CE format in the current LTE Rel-8/9 is not applicable to an LTE-A system is solved.

18 Claims, 10 Drawing Sheets

(52) U.S. Cl.
CPC .......... H04L 5/0053 (2013.01); H04L 5/0057 (2013.01); H04W 52/34 (2013.01)

(58) Field of Classification Search
USPC ........ 370/329, 328, 252, 318, 310; 455/522, 455/509, 450
See application file for complete search history.

(56) References Cited

U.S. PATENT DOCUMENTS

| | | | |
|---|---|---|---|
| 8,457,676 B2* | 6/2013 | Michel et al. | 455/522 |
| 8,537,767 B2* | 9/2013 | Zhang et al. | 370/329 |
| 2010/0238863 A1* | 9/2010 | Guo et al. | 370/328 |
| 2010/0272046 A1* | 10/2010 | Guo | 370/329 |
| 2011/0092217 A1* | 4/2011 | Kim et al. | 455/450 |
| 2011/0292874 A1* | 12/2011 | Ho et al. | 370/328 |
| 2011/0310760 A1* | 12/2011 | Wu et al. | 370/252 |
| 2012/0039223 A1* | 2/2012 | Chang | 370/310 |
| 2012/0040707 A1* | 2/2012 | Kim et al. | 455/522 |
| 2012/0087317 A1* | 4/2012 | Bostrom et al. | 370/329 |
| 2012/0218904 A1* | 8/2012 | Narasimha et al. | 370/248 |

FOREIGN PATENT DOCUMENTS

| | | |
|---|---|---|
| CN | 101729108 A | 6/2010 |
| CN | 2010065759 A2 | 6/2010 |
| CN | 102104905 A | 6/2011 |

OTHER PUBLICATIONS

Ericsson et al: "Details of PHR Handling for CA", 3GPP Draft; R2-103570, Details of PHR Handling for CA, 3rd Generation Partnership Project (3GPP), Mobile Competence Centre ; 650, Route Des Lucioles; F-06921 Sophia-Antipolis Cedex; France, vol. RAN WG2, No. Stockholm, Sweden; 20100628-20100702, Jun. 21, 2010 pp. 1-3.

Potevio: "Remaining Issues on PHR for CA", 3GPP Draft; R2-102770, Remaining Issues on PHR for CA, 3rd Generation Partnership Project (3GPP), Mobile Competence Centre; 650, Route Des Lucioles; F-06921 Sophia-Antipolis Cedex; France, vol. RAN WG2, No. Montreal, Canada; 20100510, May 1, 2010 pp. 1-3.

Alcatel-Lucent Shanghai Bell et al: "MAC PHR CE format design for LTE-A CA Scenario", 3GPP Draft; R2-103678, 3rd Generation Partnership Project (3GPP), Mobile Competence Centre; 650, Route Des Lucioles; F-06921 Sophia-Antipolis Cedex; France, vol. RAN WG2, No. Stockholm, Sweden; 20100628, Jun. 22, 2010, Pp. 1-4.

Ericsson: "Summary of e-mail discussion [70#15] LTE CA: PHR Handling", 3GPP Draft; R2-103580, Summary of RAN2-70 NR 15-PHR Handling, 3rd Generation Partnership Project (3GPP), Mobile Competence Centre ; 650, Route Des Lucioles ; F-06921 Sophia-Antipolis Cedex; France, vol. RAN WG2, No. Stockholm, Sweden; 20100628-20100702, Jun. 22, 2010 pp. 1-17.

Ericsson et al: "Introduction of CA to the MAC Specification", 3GPP Draft; 36321_R2-103652_Introduction of CA, 3rd Generation Partnership Project (3GPP), Mobile Competence Centre; 650, Route Des Lucioles; F-06921 Sophia-Antipolis Cedex; France, vol. RAN WG2, No. Stockholm, Sweden; 20100628, Jun. 21, 2010, pp. 1-50.

Office Action dated Jan. 30, 2013 for Chinese Patent Application No. 201010253657.0 and its English translation provide by applicant's foreign counsel.

Office Action dated Apr. 28, 2014 for Korean Patent Application No. 10-2012-7031274 and its English translation provide by applicant's foreign counsel.

Final Rejection dated Mar. 19, 2015 for Korean Patent Application No. 10-2012-07031274 and its English translation provide by applicant's foreign counsel.

International Search Report and Written Opinion for PCT/CN2011/078387 mailed on Nov. 17, 2011.

* cited by examiner

R/R/E/LCID sub-header

| R | R | Whether the PH on all CCs is calculated through virtual PUSCH/PUCCH is shown in bitmap mode. |
|---|---|---|
| R | R | PHue( optional) |
| R | R | PHcc1- type2( optional) |
| R | R | PHcc1 - type1 |
| R | R | PHcc2 - type1 |
| R | R | PHcc3 - type1 |

| R | R | PHue |
|---|---|---|
| R | R | PHcc1 - type2 |
| R | R | PHcc1 - type1 |
| R | R | PHcc2 - type1 |
| R | R | PHcc3 - type1 |
| R | R | PHcc4 - type1 |
| R | R | PHcc5 - type1 |

| R | R | Whether the PH on all ULCC is calculated through virtual PUSCH/PUCCH is shown in bitmap mode. |
|---|---|---|
| R | R | PHue |
| R | R | PHcc1 - type 2 |
| R | R | PHcc1 - type 1 |
| R | R | PHcc2 - type 1 |
| R | R | PHcc3 - type 1 |
| R | R | PHcc4 - type 1 |
| R | R | PHcc5 - type 1 |

Figure 11

| R | R | PHcc1 - type 1 |
|---|---|---|
| R | R | PHcc2 - type 1 |
| R | R | PHcc3 - type 1 |
| R | R | PHcc5 - type 1 |

Figure 12

| R | R | CC5 PH indication | CC4 PHCC5 PH indication | CC3 PHCC5 PH indication | CC2 type2 PHCC5 PH indication | CC2 type1 PHCC5 PH indication | CC1 PHCC5 PH indication |
|---|---|---|---|---|---|---|---|
| R | R | PHcc1 - type 1 ||||||
| R | R | PHcc2 - type 1 ||||||
| R | R | PHcc3 - type 1 ||||||
| R | R | PHcc5 - type 1 ||||||

Figure 13

| R | R | PHcc1 - type 1 |
|---|---|---|
| R | R | PHcc2 - type 1 |
| R | R | PHcc2 - type 2 |
| R | R | PHcc3 - type 1 |
| R | R | PHcc5 - type 1 |

Figure 14

| R | R | CC5 PH indication | CC4 PH indication | CC3 PH indication | CC2 type2 PH indication | CC2 type1 PH indication | CC1 PH indication |
|---|---|---|---|---|---|---|---|
| R | R | \multicolumn{6}{c}{PHcc1 - type 1} |
| R | R | \multicolumn{6}{c}{PHcc2 - type 1} |
| R | R | \multicolumn{6}{c}{PHcc2 - type 2} |
| R | R | \multicolumn{6}{c}{PHcc3 - type 1} |
| R | R | \multicolumn{6}{c}{PHcc5 - type 1} |

Figure 15

| R | R | PHue |
|---|---|---|
| R | R | PHcc1 - type 1 |
| R | R | PHcc2 - type 1 |
| R | R | PHcc2 - type 2 |
| R | R | PHcc3 - type 1 |
| R | R | PHcc5 - type 1 |

Figure 16

| R | CC5 PH indication | CC4 PH indication | CC3 PH indication | CC2 type2 PH indication | CC2 type1 PH indication | CC1 PH indication | UE PH indication |
|---|---|---|---|---|---|---|---|
| R | R | \multicolumn{6}{c|}{PHue} | | | | | |

| R | CC5 PH indication | CC4 PH indication | CC3 PH indication | CC2 type2 PH indication | CC2 type1 PH indication | CC1 PH indication | UE PH indication |
|---|---|---|---|---|---|---|---|
| R | R | | | | | | |

Table (Figure 17):

| | | |
|---|---|---|
| R | R | PHue |
| R | R | PHcc1 - type1 |
| R | R | PHcc2 - type1 |
| R | R | PHcc2 - type2 |
| R | R | PHcc3 - type1 |
| R | R | PHcc5 - type1 |

Figure 17

| | | |
|---|---|---|
| R | R | PHue |
| R | R | PHcc1 - type1 |
| R | R | PHcc2 - type1 |
| R | R | PHcc2 - type2 |
| R | R | PHcc3 - type1 |
| R | R | PHcc5 - type1 |

Figure 18

| R | CC5 PH indication | CC4 PH indication | CC3 PH indication | CC2 type2 PH indication | CC2 type1 PH indication | CC1 PH indication | UE PH indication |
|---|---|---|---|---|---|---|---|
| R | R | \multicolumn{6}{c}{PHue} | | | | | | |
| R | R | PHcc1 - type1 | | | | | |
| R | R | PHcc2 - type1 | | | | | |
| R | R | PHcc2 - type2 | | | | | |
| R | R | PHcc3 - type1 | | | | | |
| R | R | PHcc5 - type1 | | | | | |

Figure 19

| R | R | PHcc1 - type 1 |
|---|---|---|
| R | R | PHcc2 - type 1 |
| R | R | PHcc2 - type 2 |
| R | R | PHcc5 - type 1 |

Figure 20

| R | R | CC5 PH indication | CC4 PH indication | CC3 PH indication | CC2 type2 PH indication | CC2 type1 PH indication | CC1 PH indication |
|---|---|---|---|---|---|---|---|
| R | R | PHcc1 - type 1 | | | | | |
| R | R | PHcc2 - type 1 | | | | | |
| R | R | PHcc2 - type 2 | | | | | |
| R | R | PHcc5 - type 1 | | | | | |

Figure 21

| R | R | PHue |
|---|---|---|
| R | R | PHcc1 - type1 |
| R | R | PHcc2 - type1 |
| R | R | PHcc2 - type2 |
| R | R | PHcc5 - type1 |

Figure 22

| R | CC5 PH indication | CC4 PH indication | CC3 PH indication | CC2 type2 PH indication | CC2 type1 PH indication | CC1 PH indication | UE PH indication |
|---|---|---|---|---|---|---|---|
| R | R | \multicolumn{6}{c}{PHue} | | | | | | |
| R | R | \multicolumn{6}{c}{PHcc1 - type1} | | | | | | |
| R | R | \multicolumn{6}{c}{PHcc2 - type1} | | | | | | |
| R | R | \multicolumn{6}{c}{PHcc2 - type2} | | | | | | |
| R | R | \multicolumn{6}{c}{PHcc5 - type1} | | | | | | |

Figure 23

| R | R | PHue |
|---|---|---|
| R | R | PHcc1 - type1 |
| R | R | PHcc2 - type1 |
| R | R | PHcc2 - type2 |
| R | R | PHcc5 - type1 |

Figure 24

| R | CC5 PH indication | CC4 PHindication | CC3 PH indication | CC2 type2 PH indication | CC2 type1 PH indication | CC1 PH indication | UE PH indication |
|---|---|---|---|---|---|---|---|
| R | R | \multicolumn{6}{c}{PHue} | | | | | | |
| R | R | \multicolumn{6}{c}{PHcc1 - type1} | | | | | | |
| R | R | \multicolumn{6}{c}{PHcc2 - type1} | | | | | | |
| R | R | \multicolumn{6}{c}{PHcc2 - type2} | | | | | | |
| R | R | \multicolumn{6}{c}{PHcc5 - type1} | | | | | | |

METHOD AND APPARATUS FOR REPORTING POWER HEADROOM IN CARRIER AGGREGATION SCENARIO

CROSS REFERENCE TO RELATED APPLICATIONS

This application is a continuation of PCT/CN2011/078387 filed on Aug. 12, 2011, which claims priority to Chinese Patent Application No. 201010253657.0 entitled "Method and Apparatus for Reporting Power Headroom in Carrier Aggregation Scenario" filed in the Patent Office of the People's Republic of China on Aug. 13, 2010, the disclosures of which are incorporated by reference in their entireties.

FIELD OF THE INVENTION

The present invention relates to the field of communication technology, in particular to the method and apparatus for reporting power headroom in carrier aggregation scenario.

BACKGROUND OF THE PRESENT INVENTION

With the development of communication technology, LTE-A (Long Term Evolution Advanced) system has witnessed great improvement of peak rate compared with LTE (Long Term Evolution), and is required to reach 1 Gbps downlink and 500 Mbps uplink. Meanwhile, LTE-A system needs better compatibility with LTE system. In consideration of the improved peak rate, compatibility with LTE system and full use of spectrum resource, CA (Carrier Aggregation) technique is imported in LTE-A system.

Carrier aggregation technology means that a terminal can work on a plurality of cells at the same time and a cell comprises a pair of UL/DL (Uplink/Downlink) CC (Component Carrier) or independent DL carrier, rather than that there is only one set of carrier in the LTE system and previous wireless communication system. In the carrier aggregation system, component carriers can be continuous or discontinuous and the bandwidths of each component carriers can be the same or different. To be compatible with the LTE system, maximum bandwidth of each component carrier is limited as 20 MHz. At present, the maximum number of the cell/CC aggregated of an UE is generally considered as 5.

In addition, the cells of LTE-A is classified as:
(1) Primary cell: only one cell among the cells aggregated of UE (User Equipment) is defined as Primary cell.
(2) Secondary cell: refers to other cells aggregated of the UE other than the Primary cell.

Primary cell is selected by a base station and is configured for the terminal through a RRC (Radio Resource Control) signaling. Different terminals can be configured with different Primary cells. A PUCCH (Physical Uplink Control Channel) is configured on a UL CC of the Primary cell, and is not configured on the UL CC of the Secondary cell.

In prior art, structural diagram for a packet data unit (PDU) of a MAC (Media Access Control) layer in the LTE system is shown in FIG. 1.

In the figure, the case that a MAC PDU comprises a MAC header, a MAC SDU (Service Data Units), a MAC CE (Control Element) and a padding is marked out.

The MAC PDU has the following basic characteristcis:
The MAC header is composed of one or a plurality of MAC sub-header (s); each MAC sub-header is corresponding to a MAC SDU or a MAC CE or a padding;
Length of the MAC header and the MAC SDU is variable;
Byte alignment is required for the MAC sub-header, MAC SDU and MAC CE;
The correspondence between sequence of a bit stream of the MAC PDU from high level to low level and structural drawing of the MAC PDU in the agreement is: the reading sequence from left to right and from up to down;
Sequence of MAC CE/MAC SDU/padding in the MAC PDU is shown as below: the MAC CE is the foremost, but the MAC CE of a padding BSR (Buffer Status Reports) is excepted; MAC SDU next and finally the padding (the padding BSR is the last one in the MAC PDU);
Sequence of the sub-header corresponding to MAC CE/MAC SDU/padding in the MAC is in consistent with the sequence in the MAC PDU.

PHR (Power Headroom Reporting) is such a mechanism that the UE reports a difference between UE sending power and the maximum power to a base station.

In an LTERel-8/9 system, PH (Power Headroom) is defined aiming to a PUSCH (Physical Uplink Shared Channel) as below:

$$PH = P_{Cmax} - P_{PUSCH}$$

Wherein:
$P_{Cmax}$ represents the maximum transmission power allowed in the case the terminal meeting radio frequency index.
$P_{PUSCH}$ represents the transmission power of the terminal.
In the LTE Rel-8/9 system, the PH is reported via. a PHR MAC CE. The PHR MAC CE comprises a MAC sub-header and a MAC CE. The structural diagram of the MAC sub-header and MAC CE is respectively shown in FIG. 2 and FIG. 3.

Wherein, meaning of all fields is shown as below:
A LCID (Logical Channel Identity) field: is used to identify a logical channel number of corresponding load part. For a PHR process, the LCID is used to identify the corresponding load part, that is, the PHR. The LCID corresponding to a LTE Rel-8/9 PHR is 11010, as shown in Table 1:

TABLE 1

| Identification of Uplink LCID | |
|---|---|
| Index | LCID values |
| 00000 | CCCH |
| 00001-01010 | Identity of the logical channel |
| 01011-11001 | Reserved |
| 11010 | Power Headroom Report |
| 11011 | C-RNTI |
| 11100 | Truncated BSR |
| 11101 | Short BSR |
| 11110 | Long BSR |
| 11111 | Padding |

Wherein:
E field: represents expanded bit, which is used to indicate which one the next byte is, the MAC sub-header or a MAC load
R field: represents the reserved bit.
PH field: represents the uplink power headroom.
Furthermore, description of the PHR in the LTE-A system is made as following:

I. PH Calculation Mechanism

At present, LTE-A is generally considered to have two calculation modes for PH:

Mode I: Per CC PHR (Reporting the PHR Based on the CC)

In such mode, the PH is calculated aiming to the CC. Since different PUCCH channels are configured, different types of PHR is defined by the LTE-A aiming to the Primary cell and Secondary cell, which is specifically shown as below:

(1) The PHR of Type 1 and Type 2 is defined for the Primary cell; wherein,

Type 1: $PHR_{PUSCH} = P_{cmax,c} - P_{PUSCH}$

Type 2: $PHR_{PUCCH+PUSCH} = P_{cmax,c} - P_{PUSCH} - P_{PUCCH}$ (2) Since PUCCH is unavailable for the UL CC, only Type 1 PHR is defined for the Secondary cell:

Type 1: $PHR_{PUSCH} = P_{cmax,c} - P_{PUSCH}$

Mode II: Per UE PHR (Reporting the PHR Based on the UE)

For formula has not been determined at present. A possible mode is:

$PHR_{UE} = P_{cmax} - P_{PUSCH1} - P_{PUSCH2} - \ldots - P_{PUSCHn} - P_{PUCCH} - \text{multiple\_CC\_MPR}$ Wherein:

$P_{PUSCHn}$ represents the PUSCH power on carrier CCn configured for the UE;

multiple_CC_MPR: represents a MPR (Maximum Power Reduction) caused by the transmission of a plurality of CC;

Which PHR of the UL CC needs to be reported to the UE should be considered for both the per CC PHR in mode I and the per UE PHR in mode II. Three options are provided generally:

(1) Determine the n according to number of the UL CC configured by the base station for the UE;
(2) Determine the n according to number of the UL CC activated configured by the base station for the UE;
(3) Determine the n according to number of the UL CC with the UL grant that the base station allocates for the UE;

For the (1) and (2) above, when the UE does not have real PUCCH or PUSCH on a certain UL CC, a prior method adopted is to import a concept of "virtual PUCCH or PUSCH". That is to say calculate power of the virtual PUCCH or PUSCH by using a certain reference format. In other words, if the UE can not receive the UL grant, a virtual PHR will be calculated according to virtual PUCCH or PUSCH reference format; the real PHR will only be reported only when the real UL grant is received.

II. PH Reporting Mechanism

At present, conclusion of reporting PHR Type on the Primary cell and Secondary cell is made as follows:
(1) Only Type 1 PHR is reported on the Secondary cell.
(2) When the PUCCH and PUSCH energe at the same time on the Primary cell, the Type 1 PHR and the Type 2 PHR should be reported simultaneously.
(3) When the PUCCH and PUSCH do not emerge at the same time on the Primary cell, the conclusion whether the Type 1 PHR and the Type 2 PHR are reported simultaneously has not been made.

At present, it is inclined to that a per CC PHR on each CCs in LTE-A system will be reported at the same time if any PHR of the UE is triggered; moreover, some companies suggest reporting a per UE PHR when reporting the per CC PHR on each CC.

During implementation of the embodiments of the present invention, the applicant finds that the following problems at least exist in the available technology:

Compared with the LTE Rel-8/9, more information should be comprised for reporting of the PH in the LTE-A multiple carrier system. For example:

(1) A LTE-A CA UE is required to report the PH information of a plurality of CCs and number of the CCs can change in semi-static state or dynamically.
(2) A PHR triggering mechanism of a CA UE may be in the UE level, viz. once the PHR triggering condition is met, the per CC PH information of a plurality of CCs is required to be reported to the base station by the UE when needing to report the PHR.
(3) The Primary cell is required to distinguish whether the Type 1 PHR and the Type 2 PHR are reported at the same time.
(4) If per UE PHR exists, it is still required to distinguish UE PH information from CC PH information.

In addition, if the PH is reported based on all the UL CC with the UL grant of the UE, another problem will be brought in, viz. if the base station sends the UL grant, but the UE does not receive it, the UE will adopt the virtual PHR and the base station will consider the PHR received a the real PHR, which will cause inconsistent understanding of the base station and the UE. So PHR is required to distinguish the real from the virtual PHR.

To sum up, the PHR MAC CE format of the LTE Rel-8/9 is not applicable and a new format needs to be considered for the CA system.

SUMMARY OF THE INVENTION

The embodiments of the present invention put forward a method and apparatus for reporting power headroom in carrier aggregation scenario to solve the problem the PHR MAC CE format in prior LTE Rel-8/9 system is not applicable.

To meet the purpose, embodiments of the present invention put forward a method for reporting power headroom in carrier aggregation scenario on one hand, which comprises:

A terminal determines the length of PHR MAC CE to be reported according to the predetermined length determination strategy of PHR MAC CE;

The terminal generates PHR MAC CE according to length of the determined PHR MAC CE. The PHR MAC CE comprises the power headroom corresponding to all carriers needing to report power headroom;

The terminal sends the MAC PDU comprising the MAC sub-header corresponding to the PHR MAC CE and the PHR MAC CE to the base station.

Besides, the embodiments of the present invention also provide a terminal, including:

A setting module for setting the length determination strategy of PHR MAC CE;

A determination module for determining the length of PHR MAC CE to be reported according to the length determination strategy of PHR MAC CE set by the setting module;

A generation module for generating PHR MAC CE according to length of the PHR MAC CE determined by the determination module. The PHR MAC CE comprises the power headroom corresponding to all carriers needing to report power headroom;

A sending module for sending the MAC PDU comprising the MAC sub-header corresponding to the PHR MAC CE and the PHR MAC CE generated by the generation module to the base station.

On the other hand, embodiments of the present invention also put forward a method for reporting power headroom in carrier aggregation scenario, which comprises:

The base station receives the MAC PDU comprising PHR MAC CE and the MAC sub-header corresponding to the PHR MAC CE reported by the terminal;

The base station identifies the length of PHR MAC CE according to the predetermined strategy;

The base station acquires power headroom of each uplink component carrier reported by the terminal equipment in the PHR MAC CE according to length of the PHR MAC CE.

Besides, the embodiments of the present invention also provide a base station, including:

A setting module for setting the strategy for length identification of a media access control unit of power headroom reporting, PHR MAC CE;

A receiving module for receiving the MAC PDU comprising the MAC sub-header corresponding the PHR MAC CE and the PHR MAC CE reported by the terminal;

An identification module for identifying the length of PHR MAC CE received by the receiving module according to the identification strategy set by the setting module;

An acquisition module for acquiring power headroom of each uplink component carrier reported by the terminal from PHR MAC CE received by the receiving module according to the length of PHR MAC CE identified by the identification module.

Compared with available technology, the embodiments of the present invention have the following advantages:

By applying the technical solutions of the embodiments of the present invention, PHR MAC CE and a corresponding MAC sub-header are determined according to the number of uplink component carriers needing to report power headroom and a type of the power headroom to be reported, and indication information such as length information of the PHR MAC CE, type information of the power headroom, and information about whether the power headroom is virtual power headroom is carried therein, so that a base station can precisely obtain the power headroom of each uplink component carrier. In this way, the problem that the PHR MAC CE format in the current LTE Rel-8/9 is not applicable to an LTE-A system is solved.

BRIEF DESCRIPTION OF THE DRAWINGS

The mentioned and/or the additional aspects and advantages in the present invention will be obvious and easy to understand in description of embodiments of the present invention in combination with the attached figure below; wherein:

FIG. 11 is a structural diagram for format case VII put forward in embodiments of the present invention;

FIG. 12 is a structural diagram for format A in embodiment I put forward in embodiments of the present invention;

FIG. 13 is a structural diagram for format B in embodiment I put forward in embodiments of the present invention;

FIG. 14 is a structural diagram for format A in embodiment II put forward in embodiments of the present invention;

FIG. 15 is a structural diagram for format B in embodiment II put forward in embodiments of the present invention;

FIG. 16 is a structural diagram for format A in embodiment III put forward in embodiments of the present invention;

FIG. 17 is a structural diagram for format B in embodiment III put forward in embodiments of the present invention;

FIG. 18 is a structural diagram for format A in embodiment IV put forward in embodiments of the present invention;

FIG. 19 is a structural diagram for format B in embodiment IV put forward in embodiments of the present invention;

FIG. 20 is a structural diagram for format A in embodiment V put forward in embodiments of the present invention;

FIG. 21 is a structural diagram for format B in embodiment V put forward in embodiments of the present invention;

FIG. 22 is a structural diagram for format A in embodiment VI put forward in embodiments of the present invention;

FIG. 23 is a structural diagram for format B in embodiment VI put forward in embodiments of the present invention;

FIG. 24 is a structural diagram for format A in embodiment VII put forward in embodiments of the present invention;

DETAILED DESCRIPTION OF PREFERRED EMBODIMENTS

As shown in background technology, CA technology is imported into LTE-A system to support higher peak rate. In such a case, how to report PHR in multiple carrier system should be considered. A possible way is to report PHR base on UE, viz. all UL CCs configured, or configured and activated or with UL grant for the terminal will report PHR together as long as the PHR is triggered; however, since the information carried is limited, the prior power headroom reporting solution can not meet the reporting requirements.

Hence, the embodiments of the present invention put forward a technical solution for determining format of PHR MAC CE. By adjusting information type in PHR MAC CA and MAC sub-header, the base station can obtain the corresponding power headroom with the specific indication information and strategy treatment when carrying power headroom of each uplink component carrier.

Figure 1:
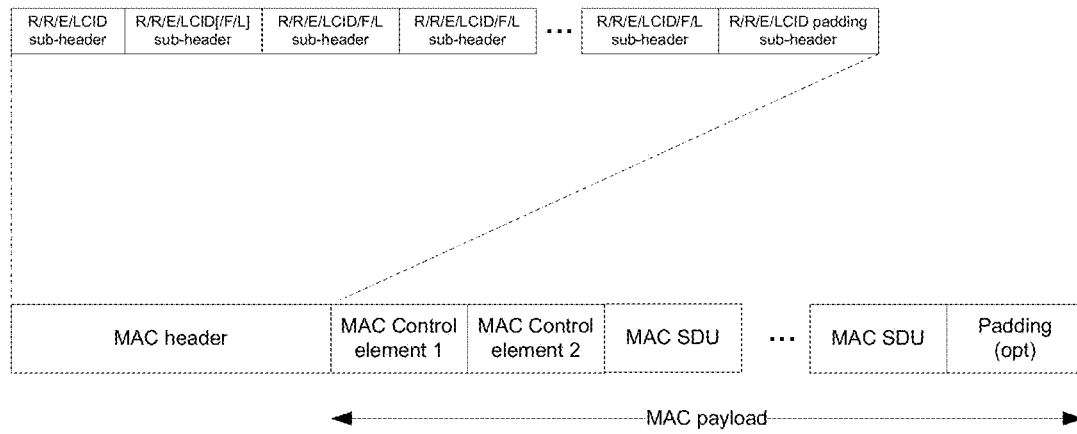
FIG. 1 is a structural diagram for MAC PDU in LTE system in prior art.
Figure 2:
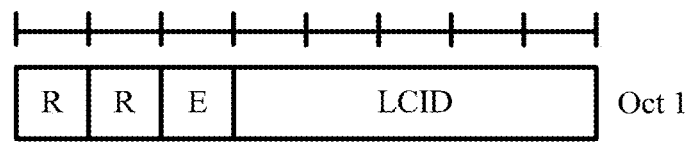
FIG. 2 is a structural diagram for MAC sub-header in prior art.
Figure 3:
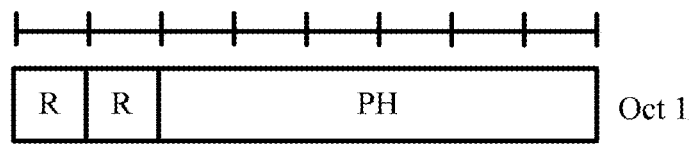
FIG. 3 is a structural diagram for MAC CE in prior art.
Figure 4:
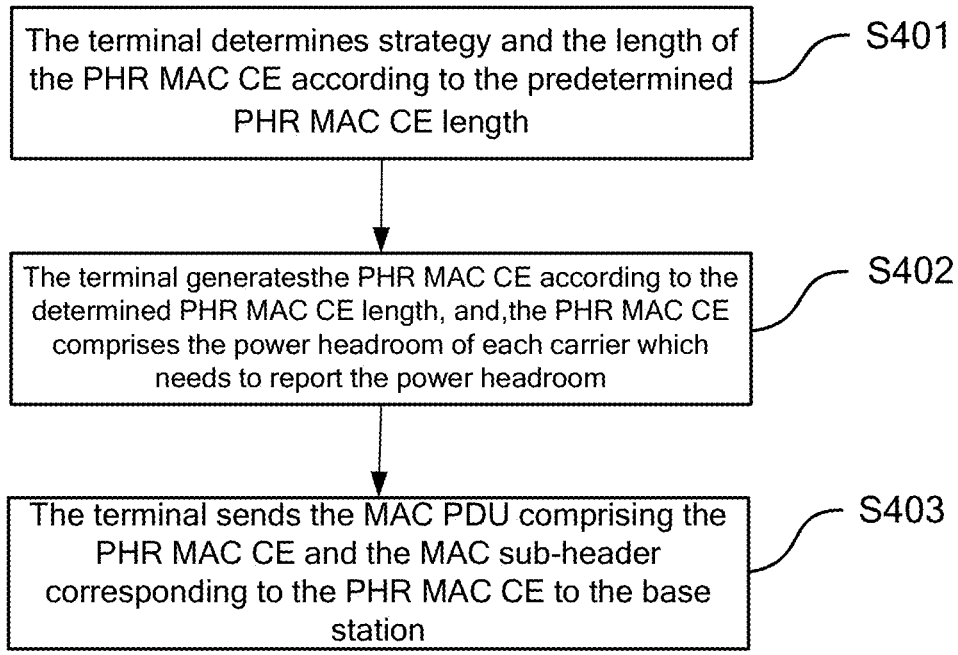
FIG. 4 is a flow diagram for the method for reporting power headroom in carrier aggregation scenario put forward in embodiments of the present invention.

FIG. 4 shows a flow diagram for the method for reporting power headroom in carrier aggregation scenario put forward in embodiments of the present invention, which specifically comprises the following steps:

Step S401: The terminal determines the length of the PHR MAC CE to be reported according to the predetermined strategies of determining PHR MAC CE length.

In practical application, determine the difference of strategies according the predetermined PHR MAC CE length. The step is specifically realized in the following two procedures:

Strategy I: The Predefined PHR MAC CE Determination Strategy is Set as the Length of the PHR MAC CE is Variable The terminal determines the length of the PHR MAC CE currently needing to be reported according to the number of the uplink component carrier needing to report power headroom at present and the power headroom type needing to be reported.

Wherein, the uplink component carrier currently needing to report power headroom at present is determined in the following ways:
(1) The terminal determines all uplink component carriers configured by the base station as the uplink component carriers currently needing to report power headroom.
(2) The terminal determines all uplink component carriers configured by the base station and in activated state as the uplink component carriers currently needing to report power headroom.

The premise for such a case is that the uplink component carrier supports activation and deactivation characteristic.
(3) The terminal determines each uplink component carrier with UL grant as the uplink component carrier currently needing to report power headroom according to the UL grant received.

Strategy II: The Predefined PHR MAC CE Determination Strategy is Set as the Length of the PHR MAC CE is Fixed
the terminal determines the fixed length of the PHR MAC CE needing to be reported according to the number of the uplink component carrier supported by the system and the power headroom type needing to be reported.

The power headroom type mentioned in strategy I and strategy II comprises Type 1 PHR and/or Type 2 PHR and/or UE PHR. The specific definition of the two types is similar to that in prior standards and will not be described in repeat hereby.

Step S402: The terminal generates the PHR MAC CE according to the determined PHR MAC CE length, and, the PHR MAC CE comprises the power headroom of each carrier which needs to report the power headroom.

Wherein, PHR MAC CE comprises the power headroom corresponding to all carriers needing to report power headroom and/or the power headroom of the UE.

It needs to be pointed out that corresponding to strategy I in the step S401, when length of the PHR MAC CE is variable, and to ensure the base station acquires length information of the PHR MAC CE and accurately obtains accurate power headroom, at least a processing procedure will be further comprised in this step:
(1) The terminal generates the MAC sub-header corresponding the PHR MAC CE. The MAC sub-header comprises a length indication field that comprises length of the PHR MAC CE determined by the terminal.
(2) The terminal adds a component carrier index information in the PHR MAC CE. The component carrier index information comprises the indication information whether the power headroom of each uplink component carrier needing to report power headroom at present is carried in the PHR MAC CE and type information of each power headroom carried in the PHR MAC CE.

The base station can accurately know which power headroom of the uplink component carrier is carried in the PHR MAC CE and whether power headroom of the UE and type of the power headroom are comprised through the component carrier index information to further determine length of the PHR MAC CE.

For example, add CC index, and/or PHR type comprised in CC (for distinguishing Type 1 PHR from Type 2 PHR; non-indication can be selected if only a type of PHR is reported on a certain CC), and/or UE PH information in the PHR MAC CE.
(3) The same strategy for determining PHR MAC CE length is set for the terminal and the base station. The base station determines length of the PHR MAC CE directly according to the length determination strategy of the PHR MAC CE.

As an implicit notification mode, the terminal is unnecessary to send any length information of the PHR MAC CE to the base station, but the base station can determine the same length result of the PHR MAC CE according to the same strategy with the terminal.

For example, the base station determines length of the PHR MAC CE according to number of the UL CC configured, or configured and activated, or with UL grant for the UE at present and PHR type needing to be reported.

On the other hand, corresponding to the strategy II in step S401, when length of the PHR MAC CE is fixed, to ensure the base station to acquire length information of the PHR MAC CE and further accurately acquire power headroom, at least a processing procedure below should be further comprised in this step:
(1) The terminal adds the component carrier index information in the PHR MAC CE. The component carrier index information comprises the indication information whether the power headroom of each uplink component carrier supported by the system and the PHR information of the UE are carried in the PHR MAC CE, and type information of each power headroom carried in the PHR MAC CE.
(2) The same PHR MAC CE length determination strategy and sequence of each power headroom are set for the terminal and the base station. The base station determines length of the PHR MAC CE directly according to the length determination strategy of the PHR MAC CE and acquires the corresponding power headroom according to the sequence of each power headroom.

In such a case, since the uplink component carrier without power headroom to be reported may exist (such as the uplink component carrier not configured for the terminal or the uplink component carrier not activated, etc.) in practical application, the terminal is required to identify whether the uplink component carrier have the power headroom to report according to sequence of each power headroom, the value of the reserved bit corresponding to each uplink component carrier supported by the system or the value of power headroom field.

For example, PH information of all types on each uplink component carrier is arranged in the predefined sequence and the position is fixed. PHR of a Per CC is positioned at first and then the PHR of a Per UE. The PHR of the Per CC is arranged according to ascending order or descending order of a cell index. The sequence setting is also applicable to the strategy I, viz. regardless of whether length of the PHR MAC CE varies, arrangement sequence of power headroom in the PHR MAC CE can be set according to ascending order of descending order of CC, and UE PH can be also arranged at the foremost or the last position; furthermore, position of component carrier index information can be set as well.

It is noted that in the both strategies, since the terminal can further report the virtual power headroom, to ensure the base station can accurately distinguish whether the power headroom is real information or virtual information, corresponding identification information is required to be set in this step, which is described specifically as below:

If the terminal does not allow reporting the virtual power head, it is only necessary to determine the strategy at terminal side and the base station side at the same time, and the base station is unnecessary to be distinguished correspondingly; the power headroom received will be real value.

While if the terminal allows reporting the virtual power headroom, the corresponding processing mode comprises the following:

(1) The terminal can add the component carrier index information in the PHR MAC CE to indicate whether the power headroom carried in the PHR MAC CE is virtual power headroom so that the base station can identify therefor.

(2) If the terminal does not add the component carrier index information in the PHR MAC CE, the terminal can determine whether power headroom is virtual power headroom according to value of the reserved bit corresponding to each power headroom comprised in the PHR MAC CE.

(3) The terminal acquires the same resource allocation status with the base station; the base station determines whether power headroom carried in the PHR MAC CE is virtual power headroom according to resource allocation status, viz. determining whether power headroom carried in the PHR MAC CE is virtual power headroom according to PUCCH resource configuration and PUSCH resource allocation of the base station.

It is another implicit notification mode; it is unnecessary for the terminal to send any indication information on virtual power headroom to the base station, but the base station can determine whether any power headroom carried in PHR MAC CE is virtual or not directly according to resource allocation status.

In addition, to ensure the base station to determine accurate power headroom type, the terminal can inform type of corresponding power headroom to the base station in following ways. Similar to prior art, types of power headroom comprises the following in practical application:

Type I: Type 1 PH on the UL CC corresponding to the Secondary cell.

Type II: Type 1 PH on the UL CC corresponding to the Primary cell.

Type III: Type 2 PH on the UL CC corresponding to the Primary cell.

It is noted that the type is optional. Whether the type emerges depends on the reporting rule of Type 2 PHR in standard. For example, if both PUCCH and PUSCH are transmitted on Primary cell at the same time, Type 1 and Type 2 PHR will be reported simultaneously.

Type IV: UE PH.

It is noted that the type is also optional. If UE PHR is defined in standards, UE PHR may be required to be reported together with th PHR of per CC. Of course, a PHR MAC CE can be defined for the UE PH independently.

Based on the division of power headroom type, type notification mode put forward in embodiments of the present invention is specifically described as below:

(1) The terminal identifies type of power headroom carried in the PHR MAC CE through LCID comprised in MAC sub-header.

For example, distinguish Type 1 PHR from Type 2 PHR in PHR MAC CE by using LCID. The specific type of LCID is shown in Table 2:

Whether Type 1 and Type 2 PHR are transmitted on Pcell simultaneously is distinguished by using LCID in Table 2.

| Index | LCID values |
|---|---|
| 00000 | CCCH |
| 00001-01010 | Identity of the logical channel |
| 01011-10111 | Reserved |
| 11000 | LTE-A Power Headroom Report (Pcell only transmits Type1 PHR) |
| 11001 | LTE-A Power Headroom Report (Pcell transmits Type1 and Type2 PHR at the same time) |
| 11010 | LTE Power Headroom Report |
| 11011 | C-RNTI |
| 11100 | Truncated BSR |
| 11101 | Short BSR |
| 11110 | Long BSR |
| 11111 | Padding |

(2) The terminal indicates type of power headroom through value of the reserved bit corresponding to each power headroom comprised in the PHR MAC CE.

That is to say, realize corresponding notification by using 2 reserved bits (R bit) in front of PH value in the PHR MAC CE, as shown in Table 3:

Table 3 distinguish PH type by using a R bit

| Rbit value | PHR Type |
|---|---|
| 00 | Type 1 |
| 01 | Type 2 |
| 10 | Reserved |
| 11 | UE |

Step S403: The terminal sends the MAC PDU comprising the PHR MAC CE and the MAC sub-header corresponding to the PHR MAC CE to the base station.

It needs to be further pointed out that to better realize compatibility with prior art, the terminal can indicate system type aiming to the PHR MAC CE through LCID comprised in MAC sub-header so that the base station can determine which one it received at present is, the PHR MAC CE of multiple carrier system obtained according to the technical solution or the PHR MAC CE in prior LTE system and meanwhile make corresponding treatment.

Figure 5:
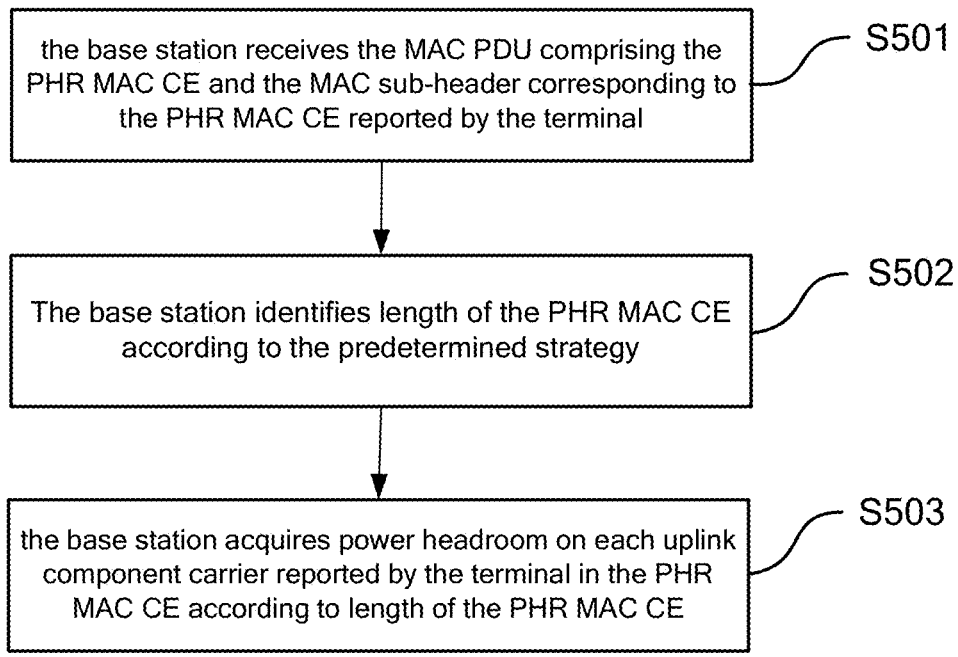
FIG. 5 is a flow diagram for the method for reporting power headroom in carrier aggregation scenario at base station side put forward in embodiments of the present invention.

The process is the realization flow of a method for reporting power headroom in carrier aggregation scenario at the terminal side put forward in embodiments of the present invention. The realization flow of a method for reporting power headroom in carrier aggregation scenario at the base station side is further described in embodiments of the present invention, and the flow diagram is shown in FIG. 5, which specifically comprises the following steps:

Step S501: the base station receives the MAC PDU comprising the PHR MAC CE and the MAC sub-header corresponding to the PHR MAC CE reported by the terminal.

Step S502: the base station identifies length of the PHR MAC CE according to the predetermined strategy.

In practical application, the step is realized comprising the following three cases:

(1) The base station determines length of the PHR MAC CE according to information in length indication field of the MAC sub-header.

(2) The base station determines length of the PHR MAC CE according to the component carrier index information in the PHR MAC CE.

(3) When length of the PHR MAC CE is fixed, the base station determines the fixed length of the PHR MAC CE according to number of the uplink component carrier supported by the system and power headroom type needing to be reported by each uplink component carrier.

Which type is to be applied can be predetermined, or identified according to the detailed information sent by the terminal side, so that the most suitable mode for processing can be selected.

Step S503: the base station acquires power headroom on each uplink component carrier reported by the terminal in the PHR MAC CE according to length of the PHR MAC CE.

In practical application, the step is realized comprising:
(1) The base station determines type of power headroom of each uplink component carrier reported by the terminal according to LCID information of the MAC sub-header, or the component carrier index information in the PHR MAC CE, or value of the reserved bit corresponding to each power headroom comprised in the PHR MAC CE and acquires power headroom of each uplink component carrier reported by the terminal in the PHR MAC CE.
(2) When length of the PHR MAC CE is fixed, the base station acquires power headroom of each uplink component carrier reported by the terminal in the PHR MAC CE according to the sequence of each power headroom in the predetermined PHR MAC CE.

It is noted that in the acquisition process of power headroom, the identification process whether the power headroom is virtual power headroom is comprised. The specific identification mode comprises the following two types:

Type I: the base station determines whether the power headroom carried in the PHR MAC CE is virtual power headroom according to LCID information of the MAC sub-header, or the component carrier index information in the PHR MAC CE, or value of the reserved bit corresponding to each power headroom comprised in the PHR MAC CE.

Type II: the base station determines whether each power headroom carried in the PHR MAC CE is virtual power headroom according to prior resource allocation status.

It needs to be further pointed out that similar to the technical process, to realize better compatibility with prior art, the base station can identify system type aiming to the PHR MAC CE through the LCID comprised in MAC sub-header and determine which one it received at present is, the PHR MAC CE of multiple carrier system obtained according to the technical solution or the PHR MAC CE in prior LTE system and meanwhile make corresponding treatment.

Compared with available technology, the embodiments of the present invention have the following advantages:

By applying the technical solutions of the embodiments of the present invention, PHR MAC CE and a corresponding MAC sub-header are determined according to the number of uplink component carriers needing to report power headroom and a type of the power headroom to be reported, and indication information such as length information of the PHR MAC CE, and/or type information of the power headroom, and/or information about whether the power headroom is virtual power headroom is carried therein, so that a base station can precisely obtain the power headroom of each uplink component carrier. In this way, the problem that the PHR MAC CE format in the current LTE Rel-8/9 is not applicable to an LTE-A system is solved.

The technical solution put forward by the embodiments of the present invention will be explained in combination with actual application context.

Firstly, embodiments of the present invention put forward the following PHR MAC CE format cases in combination with the above technical solution.

Corresponding to the strategy I in step S401, format case of the PHR MAC CE is shown as below when length of the PHR MAC CE is variable:

Format Case I

Figure 6:
FIG. 6 is a structural diagram for format case I put forward in embodiments of the present invention.

In the case length of the PHR MAC CE depends on number of the PH needing to be reported at present and information comprising an invalid PH is not allowed to be reported, sequence of the PH of all CCs and that of various PH types are shown in FIG. 6. Of course, it is just a preferential case in embodiments of the present invention; arrangement of other sequence can be applied in technical solution put forth in embodiments of the present invention.

eNB determines the specific length according to number of the CCs configured or activated at present or number of the UL CC with the UL grant as well as PHR type.

Format Case II

Figure 7:
FIG. 7 is a structural diagram for MAC sub-header in format case II put forward in embodiments of the present invention.

When the terminal determines PHR length according to number of the UL CC configured, or activated or with the UL grant, to avoid inconsistent understanding on length of the PHR MAC CE of the base station and the terminal, a length indication field can be added in the MAC sub-header corresponding to the PHR MAC CE, and format of the PHR MAC CE is kept in consistent with format case I. Format of the MAC sub-header is shown in FIG. 7; wherein, L field represents length indication field.

Format Case III

Based on format case I, the comprised CC index is further added in the PHR MAC CE with bitmap mode.

Bitmap mode comprises the following two types:
(1) Whether the PH is available is shown with 0/1 according to the CC index. For the case the PHR of a plurality of types is reported for a CC and whether the UE PHR is available, the base station can determine via. implicit way.
(2) Whether the PH is comprised is shown in bitmap type uniformly according to the CC index, the PHR Type to be reported of all CCs and whether the UE PHR is available.

Figure 8:
FIG. 8 is a structural diagram for format case III put forward in embodiments of the present invention.

Bitmap position corresponding to all CCs can be adjusted as long as ensure consistent understanding of the base station and the terminal. For example, supposing the system supports 5 CCs, CC1 represents a Pcell, and the PHR MAC CE to be reported comprises PHR of CC1/CC2/CC3. Method (2) is shown in FIG. 8.

In the mode, to avoid inconsistent understanding on the MAC CE of the base station and the terminal, format in the format case II can be adopted for PHR MAC CE sub-header.

Based on the format case I, when the UE reports the PHR according to the configured UL CC or the activated UL CC and if it is required to be able to distinguish which PHR on the ULCC is calculated based on virtual PUSCH/PUCCH, the format case further comprises the following two format cases:

Format Case IV

Figure 9:
FIG. 9 is a structural diagram for format case IV put forward in embodiments of the present invention.

As shown in FIG. 9, whether the Bitmap is calculated through the virtual PUSCH or the PUCCH can be indicated with 0/1 according to a Cell index of the UL CC. The Pcell may occupy 2 bit to respectively show whether the Type 1 and the Type 2 PHR are calculated through the virtual PUSCH or PUCCH. In addition, in case of with UE PHR, whether the UE PHR is virtual can be indicated with 1 bit.

Format Case V

Since only Type 1 PHR is reported for the Scell, whether the PH is calculated through the virtual PUSCH can be distinguished by using the two Rbits in front of the PH. As for the Pcell, if the Type 1 and Type 2 PHR is reported at the same time, it is unnecessary to distinguish Type 1 PHR from Type 2 PHR with the Rbit, but fix it in the position in the MAC CE. In such a case, whether the PH on the Pcell is calculated through the virtual PUCCH or PUSCH can also be distinguished with the Rbit.

Take the distinguishing that whether the PH on the Scell is calculated through the virtual PUSCH as the example, Rbit value can be shown in Table 4:

TABLE 4

Value of Rbit

| Rbit value | PHR Type |
|---|---|
| 00 | Type 1 (means the PH on Scell is calculated through the real PUSCH) |
| 01 | Type 2 |
| 10 | Type 1 (means the PH on Scell is calculated through the virtual PUSCH) |
| 11 | UE |

It is noted that the method for distinguishing whether the PH is calculated through the virtual PUSCH with the Rbit can also be used in the context reporting per CC PHR respectively.

Corresponding to the strategy II in step S401, format case of the PHR MAC CE is shown as below in the case that length of the PHR MAC CE is fixed:

Format Case VI

Figure 10:
FIG. 10 is a structural diagram for format case VI put forward in embodiments of the present invention.
Figure 25:
FIG. 25 is a structural diagram for format B in embodiment VII put forward in embodiments of the present invention.

Length of the PHR MAC CE depends on number of the UL CC supported by the system and information on the invalid PH allowed to comprise. Sequence of the PH of all CCs and that of various PH types are shown in FIG. 10 (supposing the system supports 5 UL CCs).

Format Case VII

Based on format case VI, if which PH of the cell is calculated through the virtual PUSCH/PUCCH is required to be distinguished in the MAC CE, the following two types can be applied:

(1) Bitmap Type

Whether PH of the cell is calculated through the virtual PUSCH/PUCCH can be shown with 0/1 according to the Cell index of the cell, as shown in FIG. 11.

(2) The Type Using Rbit:

Since only Type 1 PHR is reported on the Scell, whether the PH is calculated through the virtual PUSCH can be shown by using the Rbit. In such a case, format of the PHR MAC CE is in consistent with format case VI. If the Type 1 PHR and Type 2 PHR are reported at the same time on the Pcell, it is unnecessary to distinguish Type 1 PHR from Type 2 PHR with the R bit, and whether the Type 1 and Type 2 PHR is calculated through the virtual PUCCH/PUSCH with the Rbit.

It needs to be further pointed out that position of each CC PH and UE PH in MAC CE and position of CC bitmap can be adjusted at random as long as predefinition is conducted and the understanding of base stations is consistent with that of terminals. Such a situation belongs to protective scope of embodiments of the present invention.

The specific application procedure of the technical solution put forward in embodiments of the present invention is explained below in combination with the specific application context.

Firstly, the preconditions for the follow-up embodiments are uniformly supposed as following:

Supposing the system supports 5 UL CCs, with the No. of CC1, CC2, CC3, CC4 and CC5; wherein, CC2 represents the Pcell.

The UL CCs the base station configures for the UE are CC1, CC2, CC3 and CC5. The prior CCs activated are CC1, CC2 and CC5.

Based on the supposed preconditions, embodiments of the present invention are explained as below:

Embodiment I

Supposing the PHR is reported based on the configured UL CC, the Pcell judges that the Pcell only reports Type 1 PHR according to Type 1 and Type 2 reporting criterion; UE PHR is not imported in the standard and whether the PH is real or the virtual is unnecessary to be distinguished. The possible formats of the PHR MAC CE are as follows:

Format A: as shown in FIG. 12, the base station determines length of the PHR MAC CE implicitly; any length indication is unnecessary to be carried in PHR MAC CE.

Therein, the position of each CC PH in PHR MAC CE can be adjusted as long as predefinition is conducted and the understanding of base stations is consistent with that of terminals.

Format B: as shown in FIG. 13, CC bitmap is carried in the PHR MAC CE to indicate which PHR information of the CC is comprised in the PHR MAC CE.

Wherein, position of each CC PH in PHR MAC CE can be adjusted and sequence of CC bitmap is also adjustable as long as predefinition is conducted and the understanding of base stations is consistent with that of terminals.

Embodiment II

Supposing the PHR is reported based on the configured UL CC, the Pcell judges that the Pcell reports Type 1 PHR and Type 2 PHR at the same time according to Type 1 and Type 2 reporting criterion; UE PHR is not imported in the standard and whether the PH is real or virtual is unnecessary to be distinguished. The possible format of the PHR MAC CE is as follows: Type 1 PHR is required to be distinguished from Type 2 PHR with the R bit; for example: value of the R bit corresponding to the Type 1 PHR on each CC can be "00" and that of the R bit corresponding to the Type 2 PHR can be "01".

Format A: as shown in FIG. 14, the base station determines length of the PHR MAC CE implicitly; any length indication is unnecessary to be carried in PHR MAC CE.

Therein, the position of each CC PH in PHR MAC CE can be adjusted as long as predefinition is conducted and the understanding of base stations is consistent with that of terminals.

Format B: as shown in FIG. 15, CC bitmap is carried in the PHR MAC CE to indicate which PHR information of the CC is comprised in the PHR MAC CE.

Wherein, position of each CC PH in PHR MAC CE can be adjusted and sequence of CC bitmap is also adjustable as long as predefinition is conducted and the understanding of base stations is consistent with that of terminals.

Embodiment III

Supposing the PHR is reported based on the configured UL CC, the Pcell judges that the Pcell reports Type 1 PHR and Type 2 PHR at the same time according to Type 1 and Type 2 reporting criterion; UE PHR is imported in the standard but whether the PH is real or virtual is unnecessary to be distinguished. The possible format of the PHR MAC CE is as follows: Type 1, Type 2 PHR is required to be distinguished from UE PHR with the R bit in such embodiment; for example: value of the R bit corresponding to the Type 1 PHR can be 00 and that of the R bit corresponding to the Type 2 PHR can be 01; R bit corresponding to the UE PHR can be 11.

Format A: as shown in FIG. 16, the base station determines length of the PHR MAC CE implicitly; any length indication is unnecessary to be carried in PHR MAC CE.

Therein, the position of each CC PH in PHR MAC CE can be adjusted as long as predefinition is conducted and the understanding of base stations is consistent with that of terminals.

Format B: as shown in FIG. 17, CC bitmap is carried in the PHR MAC CE to indicate which PHR information of the CC is comprised in the PHR MAC CE.

Wherein, position of each CC PH in PHR MAC CE can be adjusted and sequence of CC bitmap is also adjustable as long as predefinition is conducted and the understanding of base stations is consistent with that of terminals Embodiment IV Supposing the PHR is reported based on the configured UL CC, the Pcell judges that the Pcell reports Type 1 PHR and Type 2 PHR at the same time according to Type 1 and Type 2 reporting criterion; UE PHR is imported in the standard but whether the PH is real or virtual is needed to be distinguished. The possible format of the PHR MAC CE is shown in format 1 or format 2 as below. In actual fact, the PHR in the embodiment share the consistent format with embodiment 3. It only needs to be noted that: a most probable method to distinguish whether the PH is virtual or real is to use R bit; however, only 2 R bits are provided, which can only distinguish 4 types. Here it is required to distinguish Type 1 PHR from Type 2 PHR and UE PHR and also the virtual PHR from the real PHR; obviously, 2 bits are inadequate, so the problem can be solved with the following methods: fix the position of the UE PHR in the PHR MAC CE (such as the first or the last Byte) and fix the sequence of the Type 1 PHR and Type 2 PHR on the Pcell in the MAC CE (such as Type 1 PHR emerges at a byte in front of the Type 2 PHR), thus whether the PH is virtual or real can be distinguished by using R bit. For example, the real PH can be shown with 00 and the virtual one can be expressed with 01.

Format A: as shown in FIG. 18, the base station determines length of the PHR MAC CE implicitly; any length indication is unnecessary to be carried in PHR MAC CE.

Therein, the position of each CC PH in PHR MAC CE can be adjusted as long as predefinition is conducted and the understanding of base stations is consistent with that of terminals.

Format B: as shown in FIG. 19, CC bitmap is carried in the PHR MAC CE to indicate which PHR information of the CC is comprised in the PHR MAC CE.

Wherein, position of each CC PH in PHR MAC CE can be adjusted and sequence of CC bitmap is also adjustable as long as predefinition is conducted and the understanding of base stations is consistent with that of terminals Embodiment V Supposing the PHR is reported based on the activated UL CC, the Pcell judges that the Pcell reports Type 1 PHR and Type 2 PHR at the same time according to Type 1 and Type 2 reporting criterion; UE PHR is not imported in the standard. The possible format of the PHR MAC CE is as follows. Type 1 PHR is required to be distinguished from Type 2 PHR with the R bit. For example, value of the Rbit corresponding to the Type 1 PHR on each CC can be "00" and that of the R bit corresponding to the Type 2 PHR can be "01".

Format A: as shown in FIG. 20, the base station determines length of the PHR MAC CE implicitly according to the activation situation; any length indication is unnecessary to be carried in PHR MAC CE.

Therein, the position of each CC PH in PHR MAC CE can be adjusted as long as predefinition is conducted and the understanding of base stations is consistent with that of terminals.

Format B: as shown in FIG. 21, CC bitmap is carried in the PHR MAC CE to indicate which PHR information of the CC is comprised in the PHR MAC CE and whether the UE PHR is existed.

Wherein, position of each CC PH in PHR MAC CE can be adjusted and sequence of CC bitmap is also adjustable as long as predefinition is conducted and the understanding of base stations is consistent with that of terminals Embodiment VI Supposing the PHR is reported based on the activated UL CC, the Pcell judges that the Pcell reports Type 1 PHR and Type 2 PHR at the same time according to Type 1 and Type 2 reporting criterion; UE PHR is imported in the standard. The possible format of the PHR MAC CE is as follows. Type 1 PHR is required to be distinguished from Type 2 PHR with the R bit. For example, value of the Rbit corresponding to the Type 1 PHR on each CC can be "00" and that of the R bit corresponding to the Type 2 PHR can be "01".

Format A: as shown in FIG. 22, the base station determines length of the PHR MAC CE implicitly according to the activation situation; any length indication is unnecessary to be carried in PHR MAC CE.

Therein, the position of each CC PH in PHR MAC CE can be adjusted as long as predefinition is conducted and the understanding of base stations is consistent with that of terminals.

Format B: as shown in FIG. 23, CC bitmap is carried in the PHR MAC CE to indicate which PHR information of the CC is comprised in the PHR MAC CE and whether the UE PHR is existed.

Wherein, position of each CC PH in PHR MAC CE can be adjusted and sequence of CC bitmap is also adjustable as long as predefinition is conducted and the understanding of base stations is consistent with that of terminals Embodiment VII Supposing the PHR is reported based on the activated UL CC, the Pcell judges that the Pcell reports Type 1 PHR and Type 2 PHR at the same time according to Type 1 and Type 2 reporting criterion; UE PHR is imported in the standard and whether the PH is virtual or real is required to be distinguished. The possible format of the PHR MAC CE is shown in format 1 or format 2 as below. In actual fact, the PHR in the embodiment share the consistent format with embodiment 6. It needs to be noted that: a most probable method to distinguish whether the PH is virtual or real is to use R bit; however, only 2 R bits are provided, which can only distinguish 4 types. Here it is required to distinguish Type 1 PHR from Type 2 PHR and UE PHR and also the virtual PHR from the real PHR; obviously, 2 bits are inadequate, so the problem can be solved with the following methods: fix the position of the UE PHR in the PHR MAC CE (such as the first or the last Byte) and fix the sequence of the Type 1 PHR and Type 2 PHR on the Pcell in the MAC CE (such as Type 1 PHR emerges at a byte in front of the Type 2 PHR), thus whether the PH is virtual or real can be distinguished by using R bit. For example, the real PH can be shown with 00 and the virtual one can be expressed with 01.

Format A: as shown in FIG. 24, the base station determines length of the PHR MAC CE implicitly according to the activation situation; any length indication is unnecessary to be carried in PHR MAC CE.

Therein, the position of each CC PH in PHR MAC CE can be adjusted as long as predefinition is conducted and the understanding of base stations is consistent with that of terminals.

Format B: CC bitmap is carried in the PHR MAC CE to indicate which PHR information of the CC is comprised in the PHR MAC CE and whether the UE PHR is existed.

Wherein, position of each CC PH in PHR MAC CE can be adjusted and sequence of CC bitmap is also adjustable as long as predefinition is conducted and the understanding of base stations is consistent with that of terminals It needs to be further pointed out that other possible formats are still available among formats put forward in the embodiments and will not be listed one by one. The typical formats will only be listed hereby. All formats conforming to idea of the technical solution put forward in embodiments of the present invention belong to the protective scope of the present invention.

Compared with available technology, the embodiments of the present invention have the following advantages:

By applying the technical solutions of the embodiments of the present invention, PHR MAC CE and a corresponding MAC sub-header are determined according to the number of uplink component carriers needing to report power headroom and a type of the power headroom to be reported, and indication information such as length information of the PHR MAC CE, type information of the power headroom, and information about whether the power headroom is virtual power headroom is carried therein, so that a base station can precisely obtain the power headroom of each uplink component carrier. In this way, the problem that the PHR MAC CE format in the current LTE Rel-8/9 is not applicable to an LTE-A system is solved.

Figure 26:
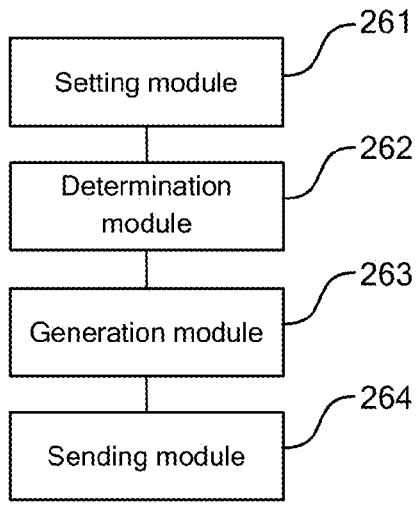
FIG. 26 is a structural diagram for terminal put forward in embodiments of the present invention.

To realize technical solution of embodiments of the present invention, a terminal is put forward in embodiments of the present invention; the structural diagram is shown in FIG. 26, which comprises specifically:

A setting module 261 for setting length determination strategy of the PHR MAC CE.

A determination module 262 for identifying length of the PHR MAC CE needing to be reported according to the length determination strategy of the PHR MAC CE set by the setting module 261.

Wherein, the determination module 262 is specifically used to:

When the length determination strategy of the PHR MAC CE set by the setting module 261 is set as length of the PHR MAC CE being variable, the determination module 262 determines length of the prior PHR MAC CE needing to report according to number of the uplink component carrier needing to report power headroom at present and power headroom type needing to be reported;

When the length determination strategy of the PHR MAC CE set by the setting module 261 is set as length of the PHR MAC CE being fixed, the determination module 262 determines the fixed length of the PHR MAC CE needing to report according to number of the uplink component carrier supported by the system and power headroom type needing to be reported.

A generation module 263 for generating PHR MAC CE according to the PHR MAC CE length determined by the determination module 262. PHR MAC CE comprises the power headroom corresponding to all carriers needing to report power headroom In practical application, the generation module 263 is also used to generate the MAC sub-header corresponding to the PHR MAC CE.

When the length determination strategy of the PHR MAC CE set by the setting module 261 is set as length of the PHR MAC CE being variable, the MAC sub-header comprises a length indication field that comprises length of the PHR MAC CE determined by the terminal.

The generation module 263 is also used to set LCID in the MAC sub-header to identify type of the power headroom carried in the PHR MAC CE, and/or indicate system type aiming to the PHR MAC CE.

The generation module 263 is also used to add the component carrier index information in the PHR MAC CE.

When the length determination strategy of the PHR MAC CE set by the setting module 261 is set as length of the PHR MAC CE being variable, the component carrier index information comprises the indication information whether the power headroom of each uplink component carrier needing to report power headroom at present is carried in the PHR MAC CE and type information of each power headroom carried in the PHR MAC CE.

When the length determination strategy of the PHR MAC CE set by the setting module 261 is set as length of the PHR MAC CE being fixed, the component carrier index information comprises the indication information whether the power headroom of each uplink component carrier supported by system is carried in the PHR MAC CE and type information of each power headroom carried in the PHR MAC CE.

A sending module 264 for sending MAC PDU comprises the PHR MAC CE generated by the generation module 263 and the MAC sub-header corresponding to PHR MAC CE to the base station.

It needs to be further pointed out that the setting module 261 is also used to set whether the virtual power headroom is allowed to be reported;

If yes, the component carrier index information added by the generation module 263 in the PHR MAC CE also comprises the indication information whether the power headroom carried in the PHR MAC CE is virtual power headroom; or, If yes, the generation module 263 is also used to set value of the reserved bit corresponding to each power headroom comprised in the PHR MAC CE to indicate whether the power headroom is the virtual power headroom.

Furthermore, the setting module 261 is also used to set the sequence of each power headroom in the PHR MAC CE when the length determination strategy of the PHR MAC CE is set as length of the PHR MAC CE being fixed;

Wherein, sequence of each power headroom is specifically as the sequence of power headroom on each uplink component carrier comprised in the PHR MAC CE, and/or the component carrier index information, and power headroom of the terminals.

On that basis, the generation module 263 is also used to set value of the reserved bit corresponding to each uplink component carrier supported by the system in the PHR MAC CE according to the sequence of each power headroom set by the setting module 261 to indicate whether power headroom of the uplink component carrier is reported.

It needs to be further pointed out that the generation module 263 is also used to set information of the reserved bit corresponding to each power headroom comprised in the PHR MAC CE to indicate type of the power headroom.

Figure 27:
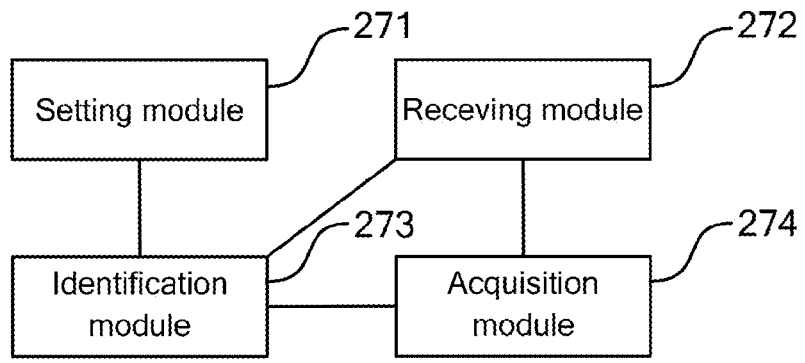
FIG. 27 is a structural diagram for base station put forward in embodiments of the present invention.

On the other hand, embodiments of the present invention put forward a base station; the structural diagram is shown in FIG. 27, which comprises:

A setting module 271 for setting length identification strategy of PHR MAC CE;

A receiving module 272 for receiving the MAC PDU comprising the PHR MAC CE and the MAC sub-header corresponding to the PHR MAC CE reported by the terminal;

An identification module 273 for identifying length of the PHR MAC CE received by the receiving module 272 according to the identification strategy set by the setting module 271;

An acquisition module 274 for acquiring power headroom of each uplink component carrier reported by the terminal in the PHR MAC CE received by the receiving module 272 according to length of the PHR MAC CE identified by the identification module 273.

Wherein, the identification module 273 is specifically used to:

Determine length of the PHR MAC CE according to information in length indication field of the MAC sub-header; or, Determine length of the PHR MAC CE according to the component carrier index information in the PHR MAC CE; or, Determine the fixed length of the PHR MAC CE according to number of the uplink component carrier supported by the system and power headroom type needing to be reported when length of the PHR MAC CE is fixed.

Wherein, the acquisition module 274 is specifically used to:

Determine type of power headroom of each uplink component carrier reported by the terminal according to LCID information of the MAC sub-header, or the component carrier index information in the PHR MAC CE, or value of the reserved bit corresponding to each power headroom comprised in the PHR MAC CE and acquire power headroom of each uplink component carrier reported by the terminal in the PHR MAC CE;

Acquire power headroom of each uplink component carrier reported by the terminal in the PHR MAC CE according to the sequence of each power headroom set by the setting module 271 when length of the PHR MAC CE is fixed.

Wherein, the acquisition module 274 is also used to:

Determine whether the power headroom carried in the PHR MAC CE is virtual power headroom according to LCID information of the MAC sub-header, or the component carrier index information in the PHR MAC CE, or value of the reserved bit corresponding to each power headroom comprised in the PHR MAC CE; or, Determine whether the power headroom carried in the PHR MAC CE is virtual power headroom according to prior resource allocation status.

Compared with available technology, the embodiments of the present invention have the following advantages:

By applying the technical solutions of the embodiments of the present invention, PHR MAC CE and a corresponding MAC sub-header are determined according to the number of uplink component carriers power headroom and a type of the power headroom to be reported, and indication information such as length information of the PHR MAC CE, and/or type information of the power headroom, and/or information about whether the power headroom is virtual power headroom is carried therein, so that a base station can precisely obtain the power headroom of each uplink component carrier. In this way, the problem that the PHR MAC CE format in the current LTE Rel-8/9 is not applicable to an LTE-A system is solved.

With the description of the preferred embodiments hereinabove, those skilled in the art can clearly understand that the present invention can be realized with the aid of hardware, or the aid of software and necessary commonly used hardware platforms as well. Based on this understanding, the technical proposal of the present invention can be reflected in the form of a software product, which is saved in a nonvolatile memory medium (which could be CD-ROM, USB flash disk, mobile HDD, etc.) comprising instructions to enable a terminal equipment, which could be a personal computer, a server or a network device, to carry out the methods for each embodiment of the present invention.

Technical personnel of the field can understand that the attached drawings only refer to the diagram of a preferred embodiment, and the module or procedure therein is unnecessary for the implementation of the embodiments of the present invention.

Technical personnel of the field can understand that modules of the units in application context can be distributed in the units of application context according to application context descriptions, or located in one or more units different from this application context through corresponding changes. Modules in the application context mentioned above can be merged into one module, or further divided into a plurality of submodules.

The number of the aforementioned embodiments of the present invention is only used for description rather than representing advantages or disadvantages of application context.

Only several specific application contexts of the embodiments of the present invention are disclosed above. However, the present invention is not only limited to those. Any change that technical personnel of the field can predict shall be protected by the present invention.

The invention claimed is:

1. A method for reporting power headroom in carrier aggregation scenario, comprising:
   determining, by a terminal, a length of a power headroom reporting (PHR) media access control (MAC) control element (CE) which needs to be reported, according to a predetermined length determination strategy of the PHR MAC CE;
   generating, by the terminal, the PHR MAC CE according to the determined length of the PHR MAC CE, wherein the PHR MAC CE comprises power headroom of each carrier which needs to report the power headroom; and
   sending, by the terminal, an MAC packet data unit (PDU) comprising the PHR MAC CE and an MAC sub-header corresponding to the PHR MAC CE, to a base station;
   wherein a step of determining, by the terminal, the length of the PHR MAC CE which needs to be reported according to the predetermined length determination strategy of the PHR MAC CE comprises:
      determining, by the terminal, a length of the PHR MAC CE which needs to be reported currently according to an amount of uplink component carriers which need to report power headroom currently and a type of the power headroom which needs to be reported, when the predetermined length determination strategy of the PHR MAC CE is that the length of the PHR MAC CE is variable;
      determining, by the terminal, a fixed length of the PHR MAC CE which needs to be reported according to an amount of uplink component carriers supported by a system and a type of the power headroom which needs to be reported, when the predetermined length determination strategy of the PHR MAC CE is that the length of the PHR MAC CE is fixed.

2. The method according to claim 1, wherein a step of determining the uplink component carrier currently which needs to report power headroom comprises:
   determining, by the terminal, that all the uplink component carriers configured by the base station are the uplink component carriers which need to report power headroom currently; or
   determining, by the terminal that all the uplink component carriers in an activated state configured by the base station are the uplink component carriers which need to report power headroom currently; or
   determining, by the terminal, according to a currently received uplink grant, that each uplink component carrier corresponding to the UL grant is the uplink component carrier which needs to report power headroom currently.

3. The method according to claim 1, wherein the type of the power headroom which needs to be reported comprises:
   power headroom type I of an uplink component carrier of a primary cell (PCell); and/or
   power headroom type II of the uplink component carrier of the PCell; and/or
   power headroom type I of an uplink component carrier of a secondary cell (SCell); and/or
   power headroom of the terminal.

4. The method according to claim 3, further comprising:
   indicating, by the terminal, the type of the power headroom carried in the PHR MAC CE of a multiple-carrier system through a logical channel identity (LCID) contained in the MAC sub-header; or
   indicating, by the terminal, the type of the power headroom through a value of a reserved bit corresponding to each power headroom contained in the PHR MAC CE.

5. The method according to claim 1, wherein, after the terminal generates the PHR MAC CE according to the determined length of the PHR MAC CE when the predetermined length determination strategy of the PHR MAC CE is that the length of the PHR MAC CE is variable, the method further comprises:
   generating, by the terminal, the MAC sub-header corresponding to the PHR MAC CE, wherein the MAC sub-header comprises a length indication field, wherein the length indication field comprises the length of the PHR MAC CE determined by the terminal; or
   adding, by the terminal, the component carrier index information in the PHR MAC CE, wherein the component carrier index information comprises indication information of whether the power headroom of each uplink component carrier which needs to report power headroom currently is carried in the PHR MAC CE and/or type information of each power headroom carried in the PHR MAC CE; or
   setting the same length determination strategy of the PHR MAC CE for the terminal and the base station, wherein the base station determines the length of the PHR MAC CE directly according to the length determination strategy of the PHR MAC CE.

6. The method according to claim 1, wherein, after the terminal generates the PHR MAC CE according to the determined length of the PHR MAC CE when the predetermined length determination strategy of the PHR MAC CE is that the length of the PHR MAC CE is fixed, the method further comprises:
   adding, by the terminal, component carrier index information in the PHR MAC CE, wherein the component carrier index information comprises indication information of whether the power headroom of each uplink component carrier supported by the system is carried in the PHR MAC CE, and/or type information of each power headroom carried in the PHR MAC CE; or
   setting the same length determination strategy of the PHR MAC CE and sequence of power headroom for the terminal and the base station, wherein the base station determines the length of the PHR MAC CE directly according to the length determination strategy of the PHR MAC CE and acquires corresponding power headroom according to the sequence of the power headroom;
   wherein the sequence of the power headroom is as the sequence of the power headroom of each uplink component carrier, and/or the component carrier index information, and/or the power headroom of the terminal in the PHR MAC CE.

7. The method according to claim 6, wherein, when the same length determination strategy of the PHR MAC CE and sequence of the power headroom are set for the terminal and the base station, the method further comprises:
   indicating, by the terminal, whether the component carrier has power headroom to be reported through a value of a reserved bit corresponding to each uplink component carrier supported by the system according to the sequence of the power headroom.

8. The method according to claim 1, wherein, if the terminal is allowed to report virtual power headroom, the method further comprises:
   adding, by the terminal, component carrier index information in the PHR MAC CE, wherein the component carrier index information comprises indication information of whether the power headroom carried in the PHR MAC CE is virtual power headroom; or indicating, by the terminal, whether the power headroom is virtual power headroom through a value of a reserved bit prior to the power headroom in the PHR MAC CE.

9. A terminal comprising:
at least one hardware processor; and
at least one memory including computer program code for one or more programs, wherein the computer program code stored in the at least one memory executed by the at least one hardware processor, causes the terminal to perform at least the following:
set a length determination strategy of a power headroom reporting (PHR) media access control (MAC) control element (CE);
determine a length of the PHR MAC CE which needs to be reported according to the length determination strategy of the set PHR MAC CE;
generate the PHR MAC CE according to the determined length of the PHR MAC CE, wherein the PHR MAC CE comprises power headroom of each carrier which needs to report power headroom; and
set an MAC packet data unit (PDU) comprising the generated PHR MAC CE and an MAC sub-header corresponding to the PHR MAC CE to a base station;
wherein the computer program code stored in the at least one memory executed by the at least one hardware processor, further causes the terminal to perform:
determine a length of the PHR MAC CE which needs to be reported currently according to an amount of uplink component carriers needing to report power headroom currently and a type of the power headroom which needs to be reported, when the set length determination strategy of the PHR MAC CE is that the length of the PHR MAC CE is variable;
determine a fixed length of the PHR MAC CE which needs to be reported according to an amount of uplink component carriers supported by a system and a type of the power headroom which needs to be reported, when the set length determination strategy of the PHR MAC CE is that the length of the PHR MAC CE is fixed.

10. The terminal according to claim 9, wherein the computer program code stored in the at least one memory executed by the at least one hardware processor, further causes the terminal to perform: generate the MAC sub-header corresponding to the PHR MAC CE;
wherein, when the set length determination strategy of the PHR MAC CE is that the length of the PHR MAC CE is variable, the MAC sub-header comprises a length indication field, wherein the length indication field comprises the determined length of the PHR MAC CE.

11. The terminal according to claim 9, wherein the computer program code stored in the at least one memory executed by the at least one hardware processor, further causes the terminal to perform: set a logical channel identity (LCID) in the MAC sub-header to indicate a type of the power headroom carried in the PHR MAC CE, and/or indicate a type of the PHR MAC CE.

12. The terminal according to claim 9, wherein the computer program code stored in the at least one memory executed by the at least one hardware processor, further causes the terminal to perform: add component carrier index information in the PHR MAC CE;
wherein, when the set length determination strategy of the PHR MAC CE is that the length of the PHR MAC CE is variable, the component carrier index information comprises indication information of whether the power headroom of each uplink component carrier which needs to report power headroom currently is carried in the PHR MAC CE and type information of the power headroom carried in the PHR MAC CE;
wherein, when the set length determination strategy of the PHR MAC CE is that the length of the PHR MAC CE is fixed, the component carrier index information comprises indication information of whether the power headroom of each uplink component carrier supported by the system is carried in the PHR MAC CE and type information of the power headroom carried in the PHR MAC CE.

13. The terminal according to claim 9, wherein the computer program code stored in the at least one memory executed by the at least one hardware processor, further causes the terminal to perform: set whether virtual power headroom is allowed to be reported;
wherein, if virtual power headroom is allowed to be reported, component carrier index information in the PHR MAC CE is added, to indicate whether the power headroom carried in the PHR MAC CE is virtual power headroom; or
wherein, if virtual power headroom is allowed to be reported, a value of a reserved bit corresponding to the power headroom in the PHR MAC CE is set, to indicate whether the power headroom is virtual power headroom.

14. The terminal according to claim 9, wherein the computer program code stored in the at least one memory executed by the at least one hardware processor, further causes the terminal to perform: set a sequence of the power headroom in the PHR MAC CE when the length determination strategy of the PHR MAC CE is that the length of the PHR MAC CE is fixed;
wherein, the sequence of the power headroom in the PHR MAC CE is as the sequence of power headroom of each uplink component carrier, and/or the component carrier index information, and/or power headroom of the terminal in the PHR MAC CE; and
wherein, a value of a reserved bit or a value of power headroom field corresponding to each uplink component carrier supported by a system in the PHR MAC CE is set according to the set sequence of the power headroom, to indicate whether the uplink component carrier has power headroom to be reported.

15. A method for reporting power headroom under carrier aggregation, the method comprising:
receiving, by a base station, a media access control (MAC) packet data unit (PDU) comprising a power headroom reporting (PHR) MAC control element (CE) and an MAC sub-header corresponding to the PHR MAC CE reported by the terminal;
identifying, by the base station, a length of the PHR MAC CE according to a predetermined strategy; and
acquiring, by the base station, power headroom of each uplink component carrier reported by the terminal in the PHR MAC CE according to length of the PHR MAC CE;
wherein the PHR MAC CE is generated by the terminal according to a determined length of the PHR MAC CE which needs to be reported, the length of the PHR MAC CE which needs to be reported is determined by the terminal according to a predetermined length determination strategy of the PHR MAC CE;
wherein a step of determining, by the terminal, the length of the PHR MAC CE which needs to be reported according to the predetermined length determination strategy of the PHR MAC CE comprises:

determining, by the terminal, a length of the PHR MAC CE which needs to be reported currently according to an amount of uplink component carriers which need to report power headroom currently and a type of the power headroom which needs to be reported, when the predetermined length determination strategy of the PHR MAC CE is that the length of the PHR MAC CE is variable;

determining, by the terminal, a fixed length of the PHR MAC CE which needs to be reported according to an amount of uplink component carriers supported by a system and a type of the power headroom which needs to be reported, when the predetermined length determination strategy of the PHR MAC CE is that the length of the PHR MAC CE is fixed.

16. The method according to claim 15, wherein a step of identifying, by the base station, a length of the PHR MAC CE according to a predetermined strategy comprises:

determining, by the base station, the length of the PHR MAC CE according to information in a length indication field of the MAC sub-header; or determining, by the base station, the length of the PHR MAC CE according to component carrier index information in the PHR MAC CE; or wherein, when the length of the PHR MAC CE is fixed, the base station determines a fixed length of the PHR MAC CE according to an amount of the uplink component carrier supported by a system and a type of power headroom which needs to be reported.

17. The method according to claim 15, wherein the base station acquires the power headroom of each uplink component carrier reported by the terminal in the PHR MAC CE according to length of the PHR MAC CE, comprising:

determining, by the base station, a type of the power headroom of each uplink component carrier reported by the terminal according to logical channel identity (LCID) information in the MAC sub-header, or the component carrier index information in the PHR MAC CE, or a value of a reserved bit corresponding to the power headroom in the PHR MAC CE, and acquiring the power headroom of each uplink component carrier reported by the terminal in the PHR MAC CE; or when the length of the PHR MAC CE is fixed, the base station acquires the power headroom of each uplink component carrier reported by the terminal in the PHR MAC CE according to a predetermined sequence of the power headroom in the PHR MAC CE.

18. The method as claimed in claim 17, further comprising:

determining, by the base station, whether the power headroom carried in the PHR MAC CE is virtual power headroom according to the LCID information of the MAC sub-header, or the component carrier index information in the PHR MAC CE, or the value of the reserved bit corresponding to the power headroom in the PHR MAC CE; or determining, by the base station, whether the power headroom carried in the PHR MAC CE is virtual power headroom according to current resource allocation status.

* * * * *